United States Patent [19]

Schoch

[11] 4,163,481
[45] Aug. 7, 1979

[54] RIM BRAKE FOR A BICYCLE

[75] Inventor: Robert Schoch, Singen, Fed. Rep. of Germany

[73] Assignee: Weinmann GmbH & Co. KG, Singen, Fed. Rep. of Germany

[21] Appl. No.: 855,991

[22] Filed: Nov. 30, 1977

[30] Foreign Application Priority Data

Dec. 9, 1976 [DE] Fed. Rep. of Germany ....... 2655699

[51] Int. Cl.² ............................................... B62L 1/10
[52] U.S. Cl. .................................... 188/24; 188/72.9
[58] Field of Search ........................ 188/24, 25, 26, 27, 188/72.7, 72.3, 72.9

[56] References Cited

U.S. PATENT DOCUMENTS

| 3,809,187 | 5/1974 | Crieve | 188/24 |
| 4,009,768 | 3/1977 | Fujii | 188/24 |

FOREIGN PATENT DOCUMENTS

| 882643 | 6/1943 | France | 188/24 |
| 902979 | 9/1945 | France | 188/24 |
| 914449 | 10/1946 | France | 188/24 |
| 1005066 | 4/1952 | France | 188/24 |
| Ad.76617 | 10/1961 | France | 188/24 |

Primary Examiner—Edward R. Kazenske
Attorney, Agent, or Firm—Learman & McCulloch

[57] ABSTRACT

A rim brake construction especially adapted for use with the rear wheel of a bicycle comprises a pair of brake units adapted for mounting on the bicycle frame members which straddle the rear wheel. Each brake unit has a housing pivotally and symmetrically mounted on its associated frame member. Each housing has a pair of brake lining carriers operable to move into braking engagement with the rear wheel rim in response to the application of a braking force. The lining carriers are biased by springs to a brake released position.

10 Claims, 5 Drawing Figures

RIM BRAKE FOR A BICYCLE

The invention relates to a bicycle rim brake, particularly for the rear wheel of a bicycle, in which the brake linings are moved inwards to be brought to rest against the rim by a toggle lever which is mounted on a tube of the bicycle frame and is actuated by a Bowden control cable, said toggle lever being retracted outwards again by spring tension.

Known bicycle rim brakes of the aforesaid type (cf. the French patent of addition No. 76617 on No. 1 228 972) provide a toggle lever with a brake lining on either side of the rim. The toggle levers are positioned in each case on one side of the supporting frame tube (i.e., asymmetrically to the frame tubing).

The great disadvantage of this known type of construction is to be found in the tendency of the toggle lever mounting to distort and to vibrate, which leads to a considerable decrease in braking efficiency and often to objectionable noises.

The object of the invention is to construct a rim brake for bicycles which will avoid the above-mentioned disadvantages, i.e., which will prevent distortion and vibration of the actuating mechanisms carrying the brake linings.

This objective is achieved according to the present invention by positioning two brake linings in a common mounting on each side of the rim and symmetrically with respect to the frame tubing supporting them.

An ideal self-centering of the rim brake is effected even in unfavourable operating conditions by this symmetrical arrangement of two brake linings which are spaced apart from each other at the rim, but which are connected by a common mounting. This serves to prevent the undesirable distortion and the disturbance caused by vibration, which occur in the known constructions because of their unilateral arrangement. The rim brake according to the present invention is also distinguished by a particularly high and uniform braking effect.

In accordance with a preferred embodiment of the invention, the common mounting for the two brake linings on the same side of the rim takes the form of a split casing which can be clipped around the frame tubing. Such a rim brake can be mounted on existing bicycles without difficulty. With such mounting the elevation of the rim brake on the frame tubing not only can be adjusted within wide limits, but also the cliplike retention of the divided guide casing on the frame tubing facilitates particularly easy alignment of the two brake linings on the same side of the rim.

Two preferred embodiments of the invention are disclosed in the following description and in the accompanying drawings, wherein.

Figure 1:
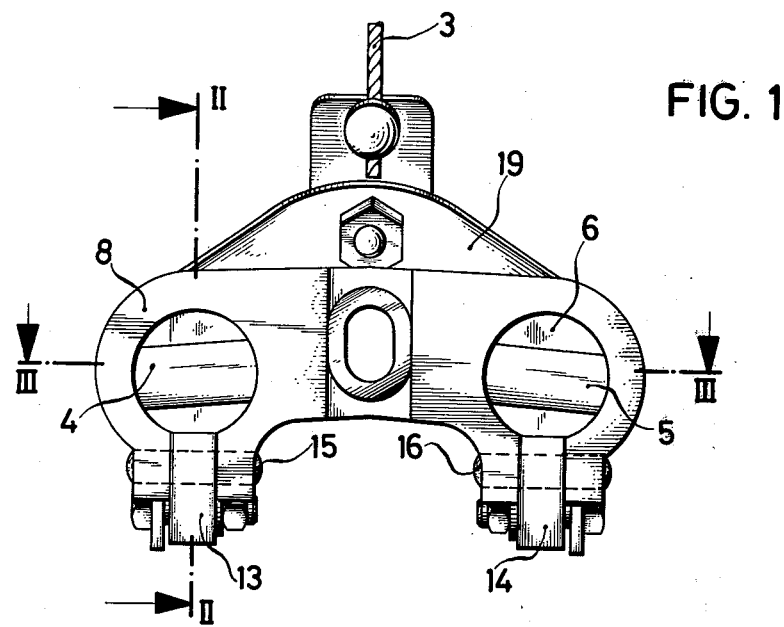
FIG. 1 is an elevational view of a first embodiment of rim brake according to the invention.
Figure 3:
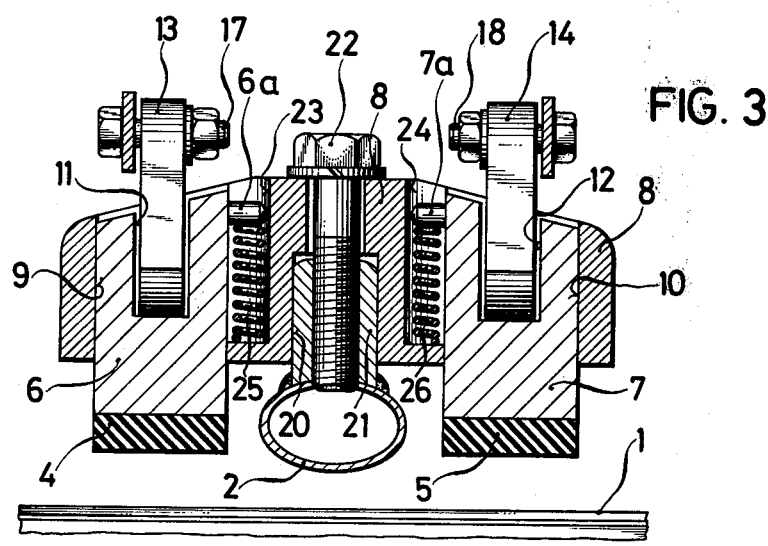
FIG. 3 is a profile section along the line III—III of FIG. 1.

FIGS. 1 and 3 illustrate the first embodiment of the invention and show one-half of the rim brake on one side of a wheel rim 1. It will be understood that a duplicate structure is at the opposite side of the rim. The rim brake is adapted to be mounted on a bicycle frame 2, and as shown in the drawings the rim brake is for the rear wheel of the bicycle. A Bowden control cable is employed for actuating the rim brake in the known manner, and is not illustrated in detail. The wire cable 3 leading to the Bowden cable control from both sides of the brake can be combined in an appropriate, conventional manner.

The rim brake contains two brake linings 4,5, which are positioned symmetrically with respect to the frame tubing 2. They are supported by the brake-lining carriers 6 and 7, respectively, which are accommodated in a common guide casing 8. For this purpose the guide casing 8 has two guide bores 9 and 10, which are preferably of cylindrical design, and in which the brake-lining carriers can slide.

At the ends opposite the brake linings 4 and 5, the brake-lining holders 6 and 7 are provided with a guide slot 11 and 12, respectively, in each of which is accommodated an actuating lever 13 and 14, respectively.

The levers 13, 14 are pivotably mounted on pins 15, 16 fixed in the guide casing 8 and have a curved pressure surface 15a (see FIG. 2), at the base 11a of the associated guide slot of the brake-lining carrier.

The two levers 13 and 14 are connected via spindles 17, 18 to a common actuating bracket 19 to which one end of the wire cable 3 is secured.

The guide casing 8 is provided with a central chamber or recess 20 which accommodates an anchor projection or mounting member 21 welded to the frame tubing 2, such projection 21 being firmly secured to the guide casing 8 by means of a screw 22. The casing 8 is pivotable about the axis of the screw 22 which axis parallels the axis of rotation of the wheel.

The guide casing 8 also includes two recesses 23, 24 which accommodate compression springs 25, 26. These compression springs seat at one end on the base of recesses 23 or 24, and at the other end on a pin or shoulder 6a and 7a, respectively, carried by the respective brake-lining carrier 6 or 7.

The guide casing 8 may comprise a light metal or plastic. The brake-lining holders 6 and 7 are preferably manufactured from a compressive-resistant and weather-resisting plastic which has a low coefficient of friction. The brake linings 4 and 5 can consist of a material normally employed for vehicle brakes (preferably using asbestos as the base material).

Figure 2:
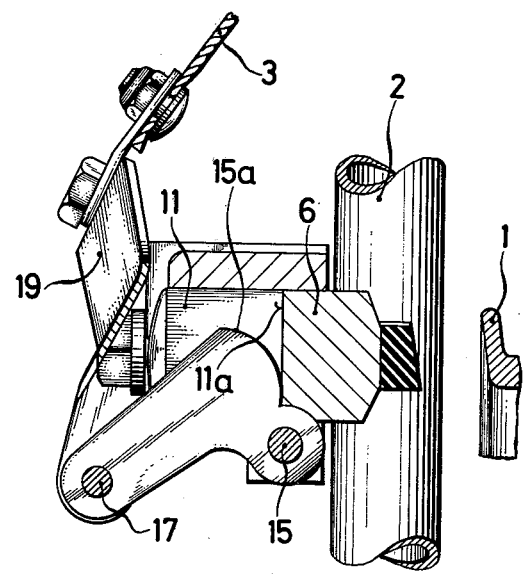
FIG. 2 is a profile section taken along the line II—II of FIG. 1; and illustrating a fragmentary portion of a wheel rim.

The rim brake illustrated in FIGS. 1-3 operates as follows:

If the wire cable 3 is drawn upwards, the two actuating levers 13 and 14 are swivelled about the axes 15 and 16 in a clockwise direction, as viewed in FIG. 2. In so doing, they move the brake-lining carriers 6 and 7 in the guide bores 9 and 10 of the guide casing 8 in the direction of the rim 1 until the brake linings 4 and 5 bear against the rim. This movement of the brake-lining carriers 6 and 7 stresses the compression springs 25, 26. As soon as the upward force on the cable 3 is released, the compression springs 25, 26 move the brake-lining carriers 6 and 7 outwards of the rim into their position of rest.

The symmetrical arrangement of the two brake linings 4 and 5 relative to the frame tubing 2 does not allow any distortion of the rim brake, even when very high braking forces are employed. At the same time, this eliminates disturbing vibrations of the rim brake.

Figure 4:
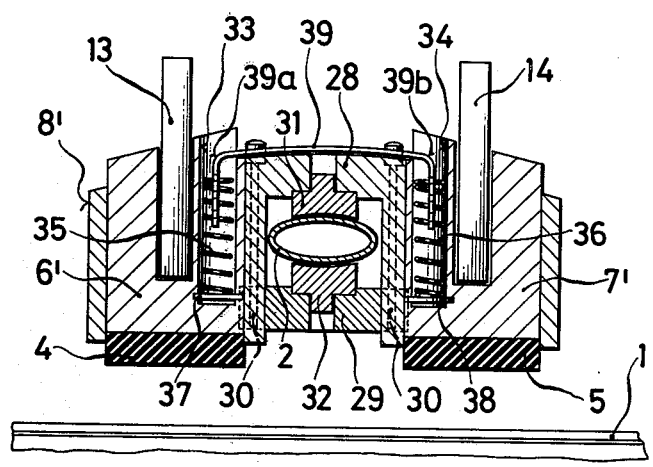
FIG. 4 is a profile section similar to FIG. 3 of a second embodiment of the invention.
Figure 5:
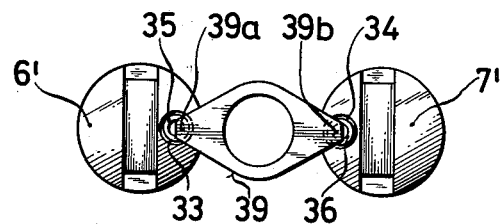
FIG. 5 is a top plan view of two brake-lining supports, and a connecting bracket as shown in FIG. 4, but omitting the casing.

The second embodiment of the invention illustrated in FIGS. 4 and 5 is similar in construction to that already described. Members which correspond to those already described therefore employ the same reference characters; to this extent a separate description is unnecessary. Again, FIGS. 4 and 5 illustrate only one-half of a complete brake; the other half is identical.

The guide casing 8' of the second embodiment is of split construction and can be clipped around the frame tubing 2. The guide casing 8' comprises a body 28 and a body or cover plate 29 secured to the body by means of screws 30. The bodies 28 and 29 form a chamber in the region surrounding the frame tubing 2, and accommodated in such chambers are concave pads or discs 31 and 32 which are rotatable relative to the members 28 and 29 about a common axis running almost parallel with the guide bores in which the lining carriers 6' and 7' are mounted. The concavity of the discs 31, 32 is adapted to the curvature of the frame tubing 2.

Each of the brake-lining supports 6' and 7' has a borehole 33, 34 running in the longitudinal direction for accommodating a retracting tension spring 35, 36. These two tension springs are secured to the respective brake-lining carrier 6' or 7' at those ends adjacent the rim 1 by a crosspin 37, 38 and have their opposite ends attached to a bracket 39 that is supported by the exterior of the guide casing 8'. The bracket 39 preferably is of the punched type and has two angle-forming ends 39a, 39b which are toothed and maintained within the tension springs 35, 36 by means of such toothing.

The mode of operation of the second embodiment of the invention is similar to that of the earlier described embodiment in that, when the brake is actuated, the brake-lining carriers 6', 7' are moved inwards by actuating levers 13, 14 until the brake linings come into contact with the rim 1. In so doing, the tension springs 35, 36 are stretched so that they may return the brake-lining carriers to their original position once the operating lever is released.

Apart from the advantage of easy assembly, the embodiment of FIGS. 4 and 5 has additional advantage when assembling, in that the tension springs 35, 36 and the bracket 39 can very easily be combined together into a single unit for assembly (and hence be most easily interchangeable, if need be.) This dispenses in particular with the necessity of individually inserting the springs into the guide casing when exchanging the brake lining.

An additional considerable advantage is that the same rim brake can be used for frame tubing of different diameters simply by exchanging the discs 31, 32. The rotatability of the discs make it possible to adjust the rim brake both in the longitudinal direction of the frame tubing, as well as in its swivel position vis-a-vis the tubing, according to requirements.

Particularly compact construction also has the distinction of enabling the two return springs 35, 36 to be placed in the respective brake-lining holders 6', 7' in a space saving manner. The utilization of return tension springs ensures a large spring range, thereby providing the desired cushioned resilience.

What is claimed is:

1. A cycle rim brake construction adapted for mounting on a cycle frame including a pair of frame members straddling a wheel having a rim, said construction comprising a casing having a chamber between its ends through which one of said frame members may extend; a pair of confronting clamp pads engageable on opposite sides of said one frame member and carried by said casing and accommodated in said chamber to permit relative rotation between said pads and casing about an axis substantially perpendicular to a plane defined by said rim; a pair of brake lining carriers; means for clamping said pads on said one frame member to thereby retain said casing in a position adjacent said rim; means mounting said carriers in said casing adjacent opposite ends of the latter and symmetrically of said axis for back and forth movements in directions substantially parallel to said axis toward and away from said rim; and actuating means carried by said casing for moving said carriers in a direction toward said rim.

2. A cycle rim brake according to claim 1 wherein said actuating means comprises a lever for each of said carriers, and means mounting said levers on said casing for movement into engagement with the associated carriers.

3. A cycle rim brake according to claim 1 including spring means acting on said carriers and biasing them in the opposite direction.

4. A cycle rim brake according to claim 3 including means connecting said spring means to said casing, said connecting means including a toothed bracket in engagement with said spring means.

5. A cycle rim brake according to claim 1 wherein each of said carriers comprises a cylindrical member accommodated in a cylindrical bore formed in said casing.

6. A cycle rim brake according to claim 5 wherein one end of each of said members has brake lining material thereon.

7. A cycle rim brake according to claim 6 wherein each of said members has a slot in its opposite end in which said actuating means is accommodated.

8. A cycle rim brake according to claim 1 wherein the confronting surfaces of said pads are concave.

9. A cycle rim brake construction adapted for mounting on a cycle frame including a pair of frame members straddling a wheel having a rim, said construction comprising a casing having a cylindrical recess therein between its ends; a projection member secured to one of said frame members and rotatably accommodated in said recess for attaching and mounting said casing for rotation about an axis substantially perpendicular to a plane defined by said rim; means extending through said casing and securing said casing on said projection member; a pair of brake lining carriers; means mounting said carriers in said casing adjacent opposite ends of the latter and symmetrically of said axis for back and forth movements in directions substantially parallel to said axis toward and away from said rim; and actuating means carried by said casing for moving said carriers in a direction toward said rim.

10. A cycle rim brake according to claim 9 including spring means biasing said carriers in the opposite direction.